United States Patent
Sawanishi et al.

(10) Patent No.: US 10,625,368 B2
(45) Date of Patent: Apr. 21, 2020

(54) RESISTANCE SPOT WELDING METHOD AND METHOD FOR MANUFACTURING RESISTANCE SPOT WELDED JOINT

(71) Applicant: JFE STEEL CORPORATION, Chiyoda-ku, Tokyo (JP)

(72) Inventors: Chikaumi Sawanishi, Tokyo (JP); Hiroshi Matsuda, Tokyo (JP); Rinsei Ikeda, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 298 days.

(21) Appl. No.: 15/555,611

(22) PCT Filed: Feb. 16, 2016

(86) PCT No.: PCT/JP2016/000790
§ 371 (c)(1),
(2) Date: Sep. 5, 2017

(87) PCT Pub. No.: WO2016/147551
PCT Pub. Date: Sep. 22, 2016

(65) Prior Publication Data
US 2018/0043459 A1  Feb. 15, 2018

(30) Foreign Application Priority Data
Mar. 16, 2015 (JP) ................. 2015-052412

(51) Int. Cl.
*B23K 11/11* (2006.01)
*B23K 11/16* (2006.01)
*B23K 11/24* (2006.01)

(52) U.S. Cl.
CPC ............. *B23K 11/115* (2013.01); *B23K 11/11* (2013.01); *B23K 11/16* (2013.01); *B23K 11/24* (2013.01)

(58) Field of Classification Search
CPC ........ B23K 11/115; B23K 11/16; B23K 11/24
(Continued)

(56) References Cited

U.S. PATENT DOCUMENTS

| 6,130,396 A | 10/2000 | Hasegawa et al. |
| 2015/0174690 A1 | 6/2015 | Furusako et al. |

(Continued)

FOREIGN PATENT DOCUMENTS

| CN | 103394801 A | 11/2013 |
| EP | 3228414 A1 | 10/2017 |

(Continued)

OTHER PUBLICATIONS

Apr. 3, 2018, Extended European Search Report issued by the European Patent Office in the corresponding European Patent Application No. 16764385.7.

(Continued)

Primary Examiner — Thien S Tran
(74) Attorney, Agent, or Firm — Kenja IP Law PC

(57) ABSTRACT

A resistance spot welding method of squeezing a predetermined sheet combination by a pair of electrodes and passing a current while applying an electrode force to join the sheet combination includes: performing test welding; and performing actual welding after the test welding, wherein in each of the test welding and the actual welding, a current pattern is divided into two or more steps including a first current passage step and a second current passage step subsequent to the first current passage step, and, in the actual welding, a current that causes no expulsion is selected to perform welding by constant current control in the first current passage step, and adaptive control welding is performed from the subsequent second current passage step onward.

16 Claims, 3 Drawing Sheets

(58) Field of Classification Search
USPC .......................................... 219/78.01, 91.22
See application file for complete search history.

(56) References Cited

U.S. PATENT DOCUMENTS

| 2016/0008913 A1* | 1/2016 | Okita .................... B23K 11/115 |
| | | 219/86.7 |
| 2016/0008914 A1 | 1/2016 | Okita et al. |

FOREIGN PATENT DOCUMENTS

| JP | H1133743 A | | 2/1999 | |
| JP | 2003071569 A | | 3/2003 | |
| JP | 2003251469 A | | 9/2003 | |
| JP | 2004358500 A | | 12/2004 | |
| JP | 2009241112 A | * | 10/2009 | |
| JP | 2009241112 A | | 10/2009 | |
| JP | 2013078806 A | | 5/2013 | |
| JP | 2013188752 A | | 9/2013 | |
| KR | 100722132 B1 | | 5/2007 | |
| WO | 2014045431 A1 | | 3/2014 | |
| WO | 2014136507 A1 | | 9/2014 | |
| WO | WO-2014136507 A1 | * | 9/2014 | ........... B23K 11/115 |
| WO | 2014156290 A1 | | 10/2014 | |
| WO | 2014136507 A8 | | 7/2015 | |

OTHER PUBLICATIONS

Sep. 8, 2018, Office Action issued by the Korean Intellectual Property Office in the corresponding Korean Patent Application No. 10-2017-7026886 with English language concise statement of relevance.

Jan. 3, 2019, Office Action issued by the State Intellectual Property Office in the corresponding Chinese Patent Application No. 201680014411.3 with English language search report.

May 10, 2016, International Search Report issued in the International Patent Application No. PCT/JP2016/000790.

* cited by examiner

RESISTANCE SPOT WELDING METHOD AND METHOD FOR MANUFACTURING RESISTANCE SPOT WELDED JOINT

TECHNICAL FIELD

The disclosure relates to a resistance spot welding method. The disclosure is particularly intended to ensure a stable nugget diameter without expulsion (splashing) regardless of disturbances such as current shunting or a sheet gap, in a sheet combination of three or more sheets with a high sheet thickness ratio in which a thin sheet is overlapped on at least one face of two or more overlapping thick sheets.

BACKGROUND

Steel sheets overlapped on each other are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. Heat generated from the resistance to the flow of the high welding current is used to obtain a spot weld. The spot weld is called a nugget, and results from the overlapping steel sheets melting and solidifying at their contact portion when the current flows through the steel sheets. The steel sheets are spot-joined by this nugget.

The joining strength of the resistance spot weld depends on the nugget diameter. Accordingly, particularly in the case where high joining strength is required as in automotive parts and the like, it is important to ensure at least a predetermined nugget diameter.

Typically, in the case where the electrode force and the welding time are constant, the nugget diameter gradually increases as the welding current increases. When the welding current reaches a certain value or more, however, expulsion occurs. Expulsion is a phenomenon in which molten metal splatters between the steel sheets. Expulsion not only is dangerous, but also degrades appearance as molten metal adheres around the weld, and causes variations in nugget diameter and joint tensile strength. This results in unstable joint quality.

Regarding the structures of automotive parts, for example, a center pillar has a structure in which a reinforcement is sandwiched between an outer portion and an inner portion. In this structure, three or more steel sheets need to be overlapped and spot welded, unlike in the case of simply spot welding two overlapping steel sheets.

Recent demand for more improved crash safety of automobiles has encouraged increases in strength and thickness of reinforcements and the like. This often creates the need to spot weld a sheet combination in which an outer portion (thin sheet) with small sheet thickness is located on the outer side and an inner portion and a reinforcement (thick sheets) with large sheet thickness are located on the inner side. Of the steel sheets in the sheet combination, a steel sheet with relatively small sheet thickness is referred to as a thin sheet, and a steel sheet with relatively large sheet thickness as a thick sheet. The same applies hereafter.

It is known that, in the case where such a sheet combination of three or more sheets with a high sheet thickness ratio ((the total thickness of the sheet combination)/(the sheet thickness of the thinnest steel sheet in the sheet combination)) is subjected to conventional spot welding of maintaining a constant electrode force and welding current, a nugget of a required size is hard to be formed between the outermost thin sheet (in contact with the electrode tip) and the thick sheet. This tendency is noticeable when the sheet thickness ratio of the sheet combination is more than 3, or further 5 or more.

This is because the temperature tends not to increase between the outermost thin sheet and the thick sheet due to cooling by the electrode tip.

The nugget is typically formed by heat generated by volume resistance according to the specific resistance of each steel sheet from near the center between the electrodes. Since the nugget grows large between the thick sheets located near the center between the electrodes before the nugget grows to the thin sheet side, expulsion occurs as it cannot be prevented by the applied electrode force. It is therefore difficult to obtain a nugget of a required size between the thin sheet and the thick sheet without expulsion in such a sheet combination.

In the case where the outermost thin sheet is the outer portion, mild steel is often used as the steel sheet because formability is more important than strength. Meanwhile, the thick sheet is a strength reinforcing member, for which a high tensile strength steel sheet is often used. In such a sheet combination, the heat generation position tends to be closer to the high tensile strength steel sheet with high specific resistance. This further hinders the nugget formation between the thick sheet and the thin sheet (mild steel). Besides, when the steel sheet used is a coated steel sheet, the coated layer that has molten at a low temperature expands the current path between the steel sheets, causing a decrease in current density. This makes the nugget formation on the thin sheet side more difficult.

Thus, a nugget of a required size is hard to be formed between the thin and thick sheets in the aforementioned sheet combination of three or more sheets with a high sheet thickness ratio. The welding condition for obtaining an appropriate nugget diameter is therefore very limited.

In addition, in the case where disturbances are present during welding such as when a point that has already been welded (existing weld) is present near the current welding point or when the parts to be welded have significant surface roughness and a contact point of the parts to be welded is present near the welding point, part of the current is shunted into such an existing weld or contact point during welding. In this state, even when current passage is performed under a predetermined condition, the current density at the position to be welded which is directly above or below the electrodes decreases, and so a nugget of a required diameter cannot be obtained. To compensate for such an insufficient amount of heat generated and obtain a nugget of a required diameter, a high welding current needs to be set beforehand.

Moreover, in the case where the surroundings of the welding point are strongly restrained due to surface roughness, member shape, and the like, a larger sheet gap between the steel sheets causes a smaller contact diameter of the steel sheets, which may hinder the obtainment of a nugget of a required diameter or facilitate expulsion.

Given that the welding condition for obtaining an appropriate nugget diameter in a sheet combination of three or more sheets with a high sheet thickness ratio is very limited as mentioned above, these disturbances may have significant effects.

As a resistance spot welding method for such a sheet combination of three or more sheets with a high sheet thickness ratio, for example, JP 2003-071569 A (PTL 1) proposes the following technique. In a sheet combination with a high sheet thickness ratio in which a thin sheet is further overlapped on two overlapping thick sheets, a bearing surface one level higher than a general portion is partly formed at the welding position of the thin sheet, and the end of the electrode facing the thin sheet is made spherical. In initial welding, the thin sheet and the adjacent thick sheet are welded with a low electrode force so as to crush the bearing surface of the thin sheet. After this, the two thick sheets are welded with a high electrode force. A required nugget is thus formed between the thin and thick sheets.

JP 2003-251469 A (PTL 2) proposes the following technique. In a method of squeezing, by a pair of electrode tips, a workpiece in which a thin sheet with low rigidity is overlapped on two thick sheets with high rigidity and spot welding the workpiece, the electrode force applied to the workpiece by the electrode tip in contact with the thin sheet lowest in rigidity is lower than the electrode force applied to the workpiece by the electrode tip in contact with the thick sheet, to form a nugget between the thin and thick sheets. The weld strength of the workpiece is thus enhanced.

JP 2004-358500 A (PTL 3) proposes the following technique. In a method of spot welding parts to be welded with a high sheet thickness ratio, after passing a welding current while applying a first electrode force to the parts to be welded, the current passage is stopped, and then a welding current is passed again while applying a second electrode force higher than the first electrode force in the state where the parts to be welded remain squeezed. Desirably, the welding current in the process of applying the first electrode force is changed in three steps of first to third steps, where the current in the second step is less than the current in each of the first and third steps. The joining strength of the parts to be welded with a high sheet thickness ratio is thus improved.

CITATION LIST

Patent Literatures

PTL 1: JP 2003-071569 A
PTL 2: JP 2003-251469 A
PTL 3: JP 2004-358500 A
PTL 4: JP H11-33743 A

SUMMARY

Technical Problem

With the resistance spot welding method described in PTL 1, although the nugget is formed, there is a problem in that a process of forming, by pressing or the like, the bearing surface one level higher than the general portion in the welding part of the thin sheet beforehand is needed.

With the resistance spot welding method described in PTL 2, the nugget is formed between the thin and thick sheets by setting the electrode force applied to the workpiece by the electrode tip in contact with the thin sheet lowest in rigidity to be lower than the electrode force applied to the workpiece by the electrode tip in contact with the thick sheet. However, since the electrode force applied to the workpiece by the electrode tip in contact with the thin sheet is low, the contact area between the thin sheet and the electrode tip is small. As a result, the range subjected to the electrode force application is reduced, which facilitates expulsion when forming a large nugget between the thick sheets. Besides, there is a possibility that a large strain occurs in the workpiece as, after squeezing the workpiece by the electrodes, a welding gun body to which the electrodes are attached is forcibly moved to produce different electrode forces.

With the resistance spot welding method described in PTL 3, current passage needs to be initially performed with a low electrode force. Here, if there is a sheet gap between the steel sheets, the contact area between the steel sheets decreases significantly, which poses difficulties in actual work.

PTL 1 to PTL 3 also have a common problem in that the welding condition for obtaining an appropriate nugget diameter in a sheet combination with a high sheet thickness ratio is very limited. Accordingly, for example in the case where disturbances such as a sheet gap or an existing weld are present, there is a need to derive an appropriate welding condition depending on the size of the sheet gap, the distance to the nearby existing weld, or the like to set an appropriate welding condition for every weld. Deriving such conditions through testing and the like requires considerable time and cost.

The present disclosure was completed in view of the above circumstances. It could be helpful to provide a resistance spot welding method with which a nugget of an appropriate diameter can be obtained without expulsion regardless of disturbances such as a sheet gap or current shunting, in a sheet combination with a high sheet thickness ratio in which a thin sheet is overlapped on two or more overlapping thick sheets.

It could also be helpful to provide a method for manufacturing a resistance spot welded joint by the resistance spot welding method.

Solution to Problem

We repeatedly conducted intensive study.

As mentioned above, the reason why expulsion occurs or an appropriate nugget diameter is hard to be ensured in resistance spot welding for a sheet combination with a high sheet thickness ratio in which a thin sheet is overlapped on two or more overlapping thick sheets is that the condition for obtaining an appropriate nugget diameter between the thin and thick sheets in particular is very limited and also the condition tends to vary due to disturbances such as a sheet gap or current shunting. As a result of conducting study in view of this, we made the following discoveries:

(1) In the case where the condition for obtaining an appropriate nugget diameter varies due to disturbances, the following process is effective: In test welding, the amount of heat generated per unit volume and per unit time with which the parts to be welded can be welded favorably is calculated from the sheet thickness of the parts to be welded and the welding time. In subsequent actual welding, adaptive control welding of adjusting the welding current or voltage to generate the calculated amount of heat generated per unit volume and per unit time is performed.

(2) Even when such adaptive control welding is performed, however, the state of contact between steel sheets tends to vary due to disturbances such as a sheet gap or current shunting, especially during initial current passage when welding the sheet combination. This may cause a situation where the amount of heat generated calculated from the interelectrode voltage and the like does not correspond to the actual amount of heat generated and the actual amount of heat generated is excessive, leading to expulsion.

(3) We conducted further study to prevent such expulsion. The current pattern in the actual welding is divided into two or more current passage steps. In the first current passage step which is initial current passage, a current that causes no expulsion is selected to perform welding by constant current control. From the subsequent second current passage step onward, adaptive control welding of adjusting the welding current or voltage to generate the amount of heat generated per unit volume and per unit time calculated in the test welding is performed. In this way, a nugget of an appropriate diameter can be obtained without expulsion regardless of disturbances such as a sheet gap or current shunting, in a sheet combination with a high sheet thickness ratio in which a thin sheet is overlapped on two or more overlapping thick sheets.

The disclosure is based on the aforementioned discoveries and further studies.

The primary features of the disclosure are as follows:

1. A resistance spot welding method of squeezing, by a pair of electrodes, a sheet combination in which a thin sheet is overlapped on at least one face of two or more overlapping thick sheets, and passing a current while applying an electrode force to join the sheet combination, the resistance spot welding method comprising: performing test welding; and performing actual welding after the test welding, wherein in each of the test welding and the actual welding, a current pattern is divided into two or more steps including a first current passage step and a second current passage step subsequent to the first current passage step, in the test welding, an amount of time variation of an instantaneous amount of heat generated per unit volume as a time variation curve and a cumulative amount of heat generated per unit volume are stored for each of the current passage steps, both the amount of time variation and the cumulative amount of heat being calculated from an electrical property between the electrodes in the case of forming an appropriate nugget by passing a current by constant current control, and in the actual welding, a current that causes no expulsion is selected to perform welding by constant current control in the first current passage step, and, from the subsequent second current passage step onward, the stored time variation curve is used as a target and, in the case where a time variation of the instantaneous amount of heat generated differs from the time variation curve in any current passage step, adaptive control welding is performed to control a current passage amount in order to compensate for the difference within a remaining welding time in the current passage step so that a cumulative amount of heat generated in the current passage step of the actual welding matches the stored cumulative amount of heat generated in the current passage step of the test welding.

2. The resistance spot welding method according to 1., wherein $0.6Is \leq I1 \leq 0.95Is$, where $I1$ is the current in the first current passage step, and $Is$ is a minimum current having a possibility of causing expulsion in absence of disturbances in the first current passage step.

3. The resistance spot welding method according to 1. or 2., wherein in the actual welding, an electrode force pattern is divided into two or more steps including a first electrode force application step and a second electrode force application step subsequent to the first electrode force application step, and at least for the first electrode force application step and the second electrode force application step, $F1<F2$, where $F1$ is an electrode force in the first electrode force application step, and $F2$ is an electrode force in the second electrode force application step.

4. The resistance spot welding method according to any of 1. to 3., wherein at least for the first current passage step and the second current passage step in the test welding, $I1'>I2'$, where $I1'$ is a current in the first current passage step, and $I2'$ is a current in the second current passage step.

5. A method for manufacturing a resistance spot welded joint by the resistance spot welding method according to any of 1. to 4.

Advantageous Effect

It is thus possible to obtain a favorable nugget without expulsion regardless of disturbances such as current shunting or a sheet gap, in a sheet combination of three or more sheets with a high sheet thickness ratio.

DETAILED DESCRIPTION

Figure 1:
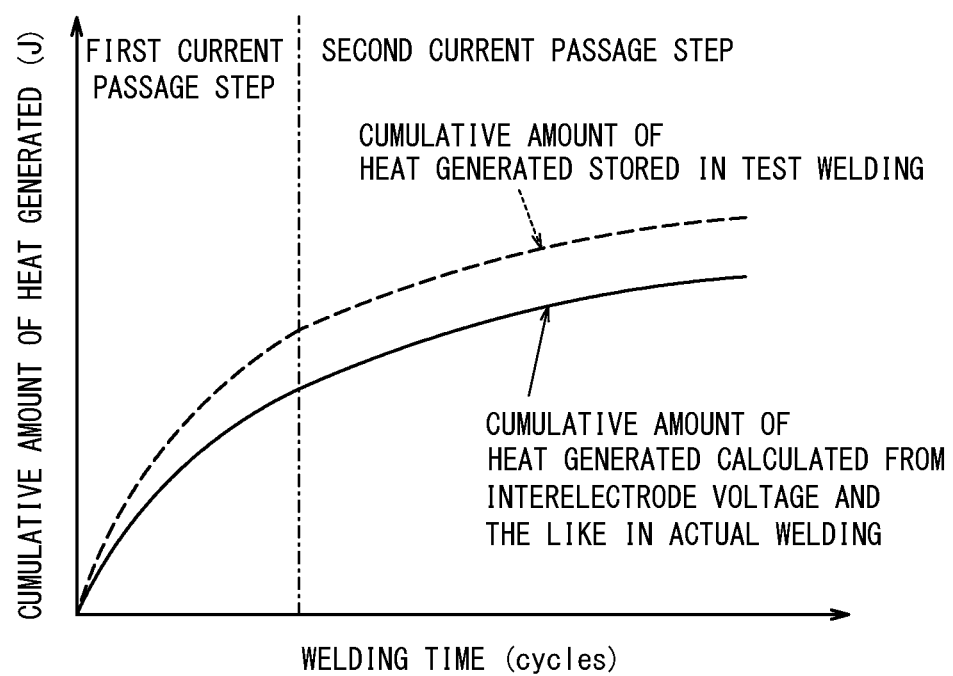
FIG. 1 is a diagram schematically illustrating an example of the relationship between the welding time and the cumulative amount of heat generated calculated from interelectrode voltage and the like in the case where the current pattern is divided into two current passage steps.

Detailed description is given below.

The disclosure relates to a resistance spot welding method of squeezing, by a pair of electrodes, a sheet combination in which a thin sheet is overlapped on at least one face of two or more overlapping thick sheets, and passing a current while applying an electrode force to join the sheet combination. The disclosure is particularly intended for a sheet combination whose sheet thickness ratio ((the total thickness of the sheet combination)/(the sheet thickness of the thinnest steel sheet (metal sheet) in the sheet combination)) is more than 3 or further 5 or more, for which it has been difficult to obtain a nugget of a required size between the thin and thick sheets without expulsion. The upper limit of the sheet thickness ratio is not particularly limited, but is typically 12.

Any welding device that includes a pair of upper and lower electrodes and is capable of freely controlling each of the electrode force and the welding current during welding may be used in the resistance spot welding method according to the disclosure. The force mechanism (air cylinder, servomotor, etc.), the type (stationary, robot gun, etc.), the electrode shape, and the like are not particularly limited.

The term "thin sheet" means a steel sheet with relatively small sheet thickness and the term "thick sheet" means a steel sheet with relatively large sheet thickness, of the steel sheets used in the sheet combination. Typically, the sheet thickness of the thin sheet is approximately ¾ or less of that of the steel sheet (thick sheet) with the largest sheet thickness.

In the resistance spot welding method according to the disclosure, the current pattern in actual welding is divided into two or more current passage steps to perform welding.

Before the actual welding, test welding is performed with the current pattern being divided into the two or more current passage steps as in the actual welding. In the test welding, the amount of time variation of the instantaneous amount of heat generated per unit volume as a time variation curve and the cumulative amount of heat generated per unit volume are stored for each of the current passage steps, where both the amount of time variation and the cumulative amount of heat are calculated from the electrical property between the electrodes in the case of forming an appropriate nugget by passing a current by constant current control.

For the test welding, a welding test with the same steel type and sheet thickness as the parts to be welded is performed by constant current control under various conditions in the state where there is no current shunting to an existing weld or sheet gap, to find an optimal condition in the test welding.

Then, for each current passage step, the time variation of the instantaneous amount of heat generated per unit volume is stored as a time variation curve, and the cumulative amount of heat generated per unit volume is stored. Both the time variation and the cumulative amount are calculated from the electrical property between the electrodes during the welding performed under the aforementioned condition. The electrical property between the electrodes means the interelectrode resistance or the interelectrode voltage.

Regarding the point at which the current pattern is divided into steps, for example in the case of forming a nugget in two steps, the point of division may be when at least sufficient electrode force application and heating are performed between the thin and thick sheets to ensure such a contact diameter of the sheets that prevents expulsion.

After the test welding, the actual welding is performed. FIG. 1 illustrates an example of the relationship between the welding time and the cumulative amount of heat generated calculated from the interelectrode voltage and the like in the case where the current pattern is divided into two current passage steps. In the drawing, the solid line indicates the cumulative amount of heat generated calculated from the interelectrode voltage and the like in the actual welding, and the dashed line indicates the cumulative amount of heat generated stored in the test welding.

In the first current passage step in the actual welding, a current that causes no expulsion is selected to perform welding by constant current control. The conditions such as welding time and electrode force other than the current may be the conditions determined in the test welding.

From the subsequent second current passage step onward, the stored time variation curve is used as a target. In the case where the time variation of the instantaneous amount of heat generated differs from the time variation curve used as the target in any current passage step, adaptive control welding is performed to control the current passage amount in order to compensate for the difference within the remaining welding time in the current passage step so that the cumulative amount of heat generated in the current passage step in the actual welding matches the stored cumulative amount of heat generated in the current passage step of the test welding.

It is important to, in the first current passage step in the actual welding, select such a current that ensures the prevention of expulsion and perform constant current control. The reason why adaptive control welding is not performed in the first current passage step in the actual welding is as follows. The state of contact between sheets tends to vary significantly due to disturbances such as a sheet gap or current shunting, especially during initial current passage. This may cause a situation where the amount of heat generated calculated from the interelectrode voltage and the like does not correspond to the actual amount of heat generated and the actual amount of heat generated is excessive, leading to expulsion.

Hence, in the first current passage step in the actual welding, a current that causes no expulsion is selected to perform welding by constant current control. This establishes the state of contact between steel sheets, and eases the estimation of the amount of heat generated from parameters such as interelectrode voltage. From the subsequent second current passage step onward, the aforementioned adaptive control welding is performed to ensure an appropriate nugget diameter.

To select such a current that achieves a desired amount of heat generated between thin and thick sheets while ensuring the prevention of expulsion in the first current passage step in the actual welding, we conducted an experiment of welding steel sheets of various sheet thicknesses under various conditions involving disturbances such as a sheet gap and an existing weld.

We consequently discovered that, by setting the current I1 in the first current passage step in the actual welding to be 0.95 times or less the minimum current Is having a possibility of causing expulsion in the absence of disturbances in the first current passage step, expulsion can be prevented in the first current passage step regardless of the conditions such as disturbances. If I1 is less than 0.6 times Is, however, the amount of heat generated is insufficient and the desired nugget diameter is hard to be obtained.

Thus, Is and I1 preferably satisfy the relationship $$0.6 \times Is \leq I1 \leq 0.95 \times Is.$$

I1 is more preferably 0.65 times or more Is. I1 is more preferably 0.9 times or less Is. I1 is further preferably 0.7 times or more Is. I1 is further preferably 0.9 times or less Is.

The minimum current Is having a possibility of causing expulsion in the absence of disturbances in the first current passage step can be determined, for example, in the following manner.

First, the conditions such as welding time and electrode force are determined by the test welding, as the conditions set for the first current passage step in the actual welding. Following this, a sheet combination in the absence of disturbances is welded by constant current control under the determined conditions, with the set welding current being gradually increased. The welding current with which expulsion is observed first is set as the minimum current Is.

The increments when increasing the set welding current are not particularly limited, but are preferably about 0.5 A.

In the welding from the second current passage step onward after the first current passage step, the time variation curve stored in the test welding for each step is used as a target. If the time variation of the instantaneous amount of heat generated follows the stored time variation curve, the welding is continued without change and completed. If the time variation of the instantaneous amount of heat generated differs from the stored time variation curve used as the target in any current passage step, the adaptive control welding of controlling the current passage amount depending on the difference is carried out to compensate for the difference within the remaining welding time of the current passage step so that the cumulative amount of heat generated in the current passage step in the actual welding matches the stored cumulative amount of heat generated in the current passage step of the test welding.

The method of calculating the cumulative amount of heat generated per unit volume is not particularly limited. JP H11-33743 A (PTL 4) describes an example of the method, which may be used in this disclosure. The following is the procedure of calculating the cumulative amount Q of heat generated per unit volume according to this method.

Let t be the total thickness of the parts to be welded, r be the electrical resistivity of the parts to be welded, V be the interelectrode voltage, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Equation (1):

$$q=(V \cdot I)/(S \cdot t) \qquad (1).$$

The electrical resistance R of the columnar portion is given by the following Equation (2):

$$R=(r \cdot t)/S \qquad (2).$$

Solving Equation (2) for S and substituting the solution into Equation (1) yields the amount q of heat generated as indicated by the following Equation (3):

$$q=(V \cdot I \cdot R)/(r \cdot t^2)=(V^2)/(r \cdot t^2) \qquad (3).$$

As is clear from Equation (3), the amount q of heat generated per unit volume and per unit time can be calculated from the interelectrode voltage V, the total thickness t of the parts to be welded, and the electrical resistivity r of the parts to be welded, and is not affected by the contact area S of the electrodes and the parts to be welded. Although the amount of heat generated is calculated from the interelectrode voltage V in Equation (3), the amount q of heat generated may be calculated from the interelectrode current I. The contact area S of the electrodes and the parts to be welded need not be used in this case, either. By cumulating the amount q of heat generated per unit volume and per unit time for the welding time, the cumulative amount Q of heat generated per unit volume for the welding is obtained. As is clear from Equation (3), the cumulative amount Q of heat generated per unit volume can also be calculated without using the contact area S of the electrodes and the parts to be welded.

Although the above describes the case of calculating the cumulative amount Q of heat generated by the method described in PTL 4, the cumulative amount Q may be calculated by any other method.

In the actual welding, typically, the sheet combination is squeezed by the pair of upper and lower electrodes at a desired welding position, and electrode force application is started. After the electrode force begins to be applied, current passage is started.

Figure 2:
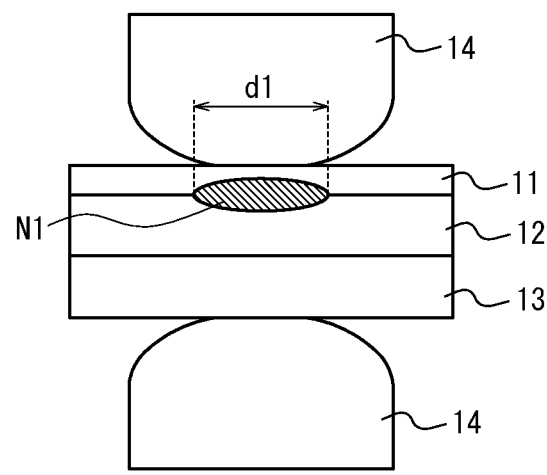
FIG. 2 is a diagram schematically illustrating an example of the nugget formation state in the first current passage step in a resistance spot welding method according to one of the disclosed embodiments.
Figure 3:
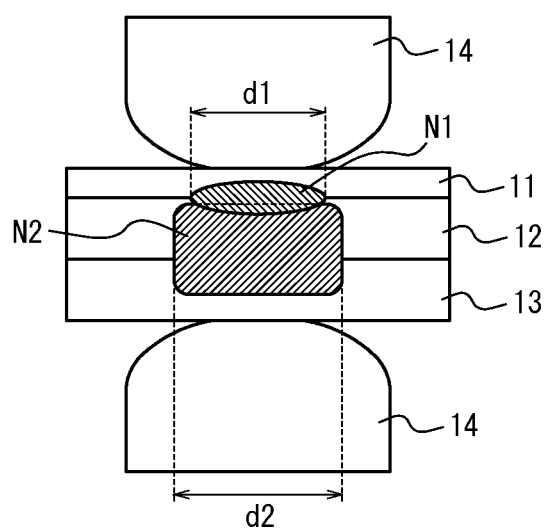
FIG. 3 is a diagram schematically illustrating an example of the nugget formation state in the second current passage step in the resistance spot welding method according to one of the disclosed embodiments.

In the first current passage step which is initial current passage, a high welding current is applied for a short time with a low electrode force to stabilize the contact between a thin sheet 11 and a thick sheet 12 and ensure desired heat generation by contact resistance, as illustrated in FIG. 2. This narrows the current path and increases the current density between the thin sheet 11 and the thick sheet 12. Heat generated by contact resistance can therefore be effectively used for the formation of a nugget N1 between the thin sheet 11 and the thick sheet 12, without being affected by current path expansion caused by a molten coating and the like. In the second current passage step, a low welding current is applied for a long time with a high electrode force to form nuggets N1 and N2 of desired diameters respectively between the thin sheet 11 and the thick sheet 12 and between the thick sheets 12 and 13, as illustrated in FIG. 3.

Although the nugget N1 is formed between the thin sheet 11 and the thick sheet 12 in the first current passage step in the example of FIG. 2, the nugget need not necessarily be formed, for example, in the case where there is a large sheet gap between the steel sheets. To form the nugget between the thin sheet 11 and the thick sheet 12 regardless of a sheet gap or current shunting, an excessively high current needs to be selected, which increases the risk of expulsion. In the case where welding is performed under the aforementioned welding condition, on the other hand, the temperature between the thin sheet 11 and the thick sheet 12 is higher than that in ordinary resistance spot welding, even if the nugget is not formed in the first current passage step. This enables melting not only between the thick sheets 12 and 13 but also between the thin sheet 11 and the thick sheet 12 in the adaptive control welding from the second current passage step onward. Thus, the resistance spot welding method according to the disclosure may form the nugget N1 between the thin and thick sheets in the first current passage step and form the nugget N2 between the thick sheets from the second current passage step onward, or simultaneously form the nuggets N1 and N2 respectively between the thin and thick sheets and between the thick sheets from the second current passage step onward.

In the actual welding, the electrode force pattern may also be divided into two or more electrode force application steps. In this case, it is preferable that $$F1<F2$$

where F1 is the electrode force in the first electrode force application step, and F2 is the electrode force in the second electrode force application step.

Setting F1 lower than F2 narrows the current path and increases the current density in the first step. This facilitates heat generation by contact resistance between the thin sheet 11 and the thick sheet 12.

The electrode force F1 (kN) in the first electrode force application step preferably satisfies $$0.8t_m \leq F1 \leq 7t_m$$

where $t_m$ (mm) is the sheet thickness of the thinnest steel sheet of the steel sheets constituting the sheet combination (the sheet thickness of the thin sheet 11 in FIG. 2).

If the electrode force F1 in the first electrode force application step is more than 7 $t_m$ (kN), the electrode force is excessively high, and the amount of heat generated by contact resistance between the thin sheet 11 and the thick sheet 12 is reduced. If the electrode force F1 in the first electrode force application step is less than 0.8 $t_m$, the contact resistance between the electrode tip and the thin sheet 11 is high, which promotes sparks and also promotes expulsion between the thin sheet 11 and the thick sheet 12. F1 is more preferably 0.9 times or more $t_m$. F1 is more preferably 6.5 times or less $t_m$.

The point of division into electrode force application steps and the point of division into current passage steps need not necessarily be the same. Particularly when the electrode force is changed, the electrode force application may become unstable due to the problem of responsiveness of the servomotor, with there being the possibility of expulsion. Accordingly, in the actual welding, it is preferable to provide a cooling time between the current passage steps and change the electrode force during the cooling time. The cooling time is preferably 1 cycle or more. The cooling time is preferably less than 10 cycles. If the cooling time is less than 1 cycle, the expulsion prevention effect mentioned above cannot be achieved. If the cooling time is 10 cycles or more, heat generation efficiency decreases. The cooling time is more preferably 2 cycles or more. The cooling time is more preferably 9 cycles or less. Here, 1 cycle is 20 ms.

To effectively use the heat generated by contact resistance in the first current passage step, it is preferable that $$I1' > I2'$$

where I1' is the current in the first current passage step and I2' is the current in the second current passage step in the test welding.

Moreover, it is preferable that $$TI1 < TI2$$

where TI1 is the welding time in the first current passage step and TI2 is the welding time in the second current passage step in the actual welding.

By performing the first current passage step by constant current control with a relatively high current, the current density between the thin sheet 11 and the thick sheet 12 can be increased to more effectively use the heat generated by contact resistance. If current passage is performed for a long time by such constant current control, however, expulsion is facilitated. It is therefore effective to set TI1<TI2 in terms of preventing expulsion.

The welding time TI1 in the first current passage step is preferably 2 cycles or more, in terms of generating a sufficient amount of heat between the thin and thick sheets. The welding time TI1 is preferably 10 cycles or less, in terms of preventing expulsion. The welding time TI1 is more preferably 3 cycles or more. The welding time TI1 is more preferably 9 cycles or less.

The welding time TI2 in the second current passage step is preferably about 5 cycles or more and 30 cycles or less, in terms of ensuring at least a predetermined nugget diameter. The welding time TI2 is more preferably 7 cycles or more. The welding time TI2 is more preferably 28 cycles or less.

Both the current pattern and the electrode force pattern from the third step onward are not particularly limited for the following reasons: current passage and electrode force application from the third step onward are likely to be intended for post-heat treatment for the joint, residual stress control, and nugget expansion while preventing expulsion, and various patterns may be assumed for such current passage and electrode force application, which are not particularly correlated with the current and electrode force in the previous steps. Moreover, a cooling time may or may not be provided between steps from the second current passage step onward.

The parts to be welded are not particularly limited. The resistance spot welding method may be used for the welding of steel sheets and coated steel sheets having various strengths from mild steel to ultra high tensile strength steel and light metal sheets of aluminum alloys and the like. The resistance spot welding method may also be used for a sheet combination of four or more overlapping steel sheets.

Examples

Figure 4:
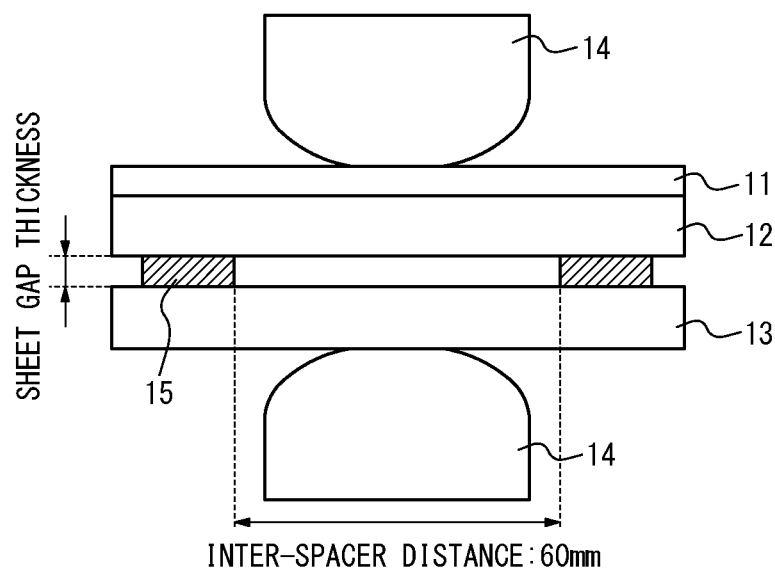
FIG. 4 is a diagram schematically illustrating the case of welding a sheet combination having a sheet gap in Examples.

For each sheet combination of three overlapping steel sheets listed in Table 1 and illustrated in FIGS. 2 to 4, resistance spot welding was performed under each condition listed in Table 2 to produce a joint.

The result in the case where the control mode is "constant current" in Table 2 indicates the result of performing welding by constant current control under the welding condition in Table 2. The result in the case where the control mode is "adaptive control" in Table 2 indicates the result of, after performing test welding by constant current control in the absence of disturbances such as a sheet gap under the welding condition in Table 2 and storing the time variation of the instantaneous amount of heat generated per unit volume, performing adaptive control welding of adjusting the current with reference to the time variation curve of the instantaneous amount of heat generated per unit volume obtained in the test welding. The conditions such as welding time and electrode force were the same in the test welding and the actual welding.

The minimum current Is having a possibility of causing expulsion in the absence of disturbances in the first current passage step was determined in the following manner. The conditions such as welding time and electrode force were determined by the test welding, as the conditions set for the first current passage step in the actual welding. Following this, a sheet combination in the absence of disturbances was welded by constant current control under the determined conditions, with the set welding current being gradually increased in increments of 0.5 A from 4.0 kA. The welding current with which expulsion was observed first was set as the minimum current Is having a possibility of causing expulsion in the absence of disturbances in the first current passage step.

Upon producing some of the joints, spacers 15 (interspacer distance: 60 mm) were inserted between the thick sheets 12 and 13 as illustrated in FIG. 4, and the sheet combination was clamped from above and below (not illustrated), to create a sheet gap of any of various sheet gap thicknesses.

An inverter DC resistance spot welder was used as the welder, and chromium copper electrodes with 6 mm face diameter DR-shaped tips were used as the electrodes.

For each obtained joint, the weld was cut and etched in section, and then observed with an optical microscope to measure each of the nugget diameter d1 between the thin and thick sheets and the nugget diameter d2 (mm) between the thick sheets. Each sample in which the nugget diameters d1 and d2 were both 4√t' or more (t': the sheet thickness (mm) of the thinner steel sheet of the adjacent two steel sheets) and no expulsion occurred was evaluated as good. Each sample in which any of the nugget diameters d1 and d2 was less than 4√t' or expulsion occurred was evaluated as poor.

TABLE 1

| Sheet combination No. | Steel sheet (thin sheet) of reference sign 11 in the drawings | Steel sheet (thick sheet) of reference sign 12 in the drawings | Steel sheet (thick sheet) of reference sign 13 in the drawings | Sheet thickness ratio |
|---|---|---|---|---|
| A | 270 MPa-grade cold rolled steel sheet (sheet thickness: 0.7 mm) | 590 MPa-grade cold rolled steel sheet (sheet thickness: 1.4 mm) | 590 MPa-grade cold rolled steel sheet (sheet thickness: 1.6 mm) | 5.3 |
| B | 270 MPa-grade GA steel sheet (sheet thickness: 0.7 mm) | 980 MPa-grade cold rolled steel sheet (sheet thickness: 2.0 mm) | 980 MPa-grade cold rolled steel sheet (sheet thickness: 2.0 mm) | 6.7 |

TABLE 1-continued

| Sheet combination No. | Steel sheet (thin sheet) of reference sign 11 in the drawings | Steel sheet (thick sheet) of reference sign 12 in the drawings | Steel sheet (thick sheet) of reference sign 13 in the drawings | Sheet thickness ratio |
|---|---|---|---|---|
| C | 270 MPa-grade GA steel sheet (sheet thickness: 0.7 mm) | 780 MPa-grade GA steel sheet (sheet thickness: 1.6 mm) | 1180 MPa-grade GA steel sheet (sheet thickness: 1.6 mm) | 5.6 |
| D | 440 MPa-grade GA steel sheet (sheet thickness: 1.0 mm) | 1470 MPa-grade cold rolled steel sheet (sheet thickness: 1.6 mm) | 1180 MPa-grade GA steel sheet (sheet thickness: 1.4 mm) | 4 |
| E | 440 MPa-grade GA steel sheet (sheet thickness: 1.0 mm) | 980 MPa-grade cold rolled steel sheet (sheet thickness: 1.8 mm) | 1470 MPa-grade GA steel sheet (sheet thickness: 1.4 mm) | 4.2 |

TABLE 2

| Joint No. | Sheet combination No. | Minimum current Is (kA) | First electrode force application step | | Second electrode force application step | | First current passage step | | |
|---|---|---|---|---|---|---|---|---|---|
| | | | Electrode force F1 (kN) | Electrode force application time TF1 (cycles) | Electrode force F2 (kN) | Electrode force application time TF2 (cycles) | Welding current I1 (I1') (kA) | Welding time TI1 (cycles) | Control mode |
| 1 | A | 8.5 | 2 | 5 | 3.5 | 15 | 7 | 5 | Constant current |
| 2 | A | 8.5 | 2 | 5 | 3.5 | 15 | 7 | 5 | Constant current |
| 3 | A | 8.5 | 2 | 5 | 3.5 | 15 | 7 | 5 | Constant current |
| 4 | A | 8.5 | 2 | 5 | 3.5 | 15 | 7 | 5 | Constant current |
| 5 | B | 10.5 | 4.1 | 3 | 5 | 19 | 9 | 3 | Constant current |
| 6 | B | 10.5 | 4.1 | 3 | 5 | 19 | 9 | 3 | Constant current |
| 7 | B | 10.5 | 4.1 | 3 | 5 | 19 | 9 | 3 | Constant current |
| 8 | C | 10 | 4 | 4 | 5 | 18 | 8 | 4 | Constant current |
| 9 | C | 10 | 4 | 4 | 5 | 18 | 8 | 4 | Constant current |
| 10 | C | 10 | 4 | 3 | 5 | 19 | 8 | 4 | Constant current |
| 11 | D | 8.5 | 4.5 | 4 | 5.5 | 20 | 7.5 | 4 | Constant current |
| 12 | D | 8.5 | 4.5 | 4 | 5.5 | 20 | 7.5 | 4 | Constant current |
| 13 | E | 9 | 4 | 3 | 6 | 20 | 8 | 3 | Constant current |
| 14 | E | 9 | 4 | 3 | 6 | 20 | 8 | 3 | Constant current |
| 15 | A | 9 | 3.5 | 20 | — | — | 8 | 20 | Constant current |
| 16 | B | 8.5 | 5 | 20 | — | — | 5 | 20 | Constant current |
| 17 | B | 8.5 | 5 | 20 | — | — | 9 | 20 | Constant current |
| 18 | B | 8.5 | 5 | 20 | — | — | 7 | 20 | Adaptive control |

| Joint No. | Second current passage step | | | | Sheet gap thickness | Evaluation | Remarks |
|---|---|---|---|---|---|---|---|
| | Cooling time Tc (cycles) | Welding current I2 (I2') (kA) | Welding time TI2 (cycles) | Control mode | | | |
| 1 | — | 6 | 15 | Adaptive control | No sheet gap | Good | Example |
| 2 | — | 6 | 15 | Adaptive control | 0.5 mm | Good | Example |
| 3 | — | 6 | 15 | Adaptive control | 1.0 mm | Good | Example |
| 4 | — | 6 | 15 | Adaptive control | 1.5 mm | Good | Example |
| 5 | 3 | 7 | 16 | Adaptive control | No sheet gap | Good | Example |
| 6 | 3 | 7 | 16 | Adaptive control | 0.7 mm | Good | Example |
| 7 | 3 | 7 | 16 | Adaptive control | 1.0 mm | Good | Example |
| 8 | 2 | 6.5 | 16 | Adaptive control | No sheet gap | Good | Example |
| 9 | 2 | 6.5 | 16 | Adaptive control | 0.8 mm | Good | Example |
| 10 | 3 | 7 | 15 | Adaptive control | 0.8 mm | Good | Example |
| 11 | 2 | 6.5 | 18 | Adaptive control | No sheet gap | Good | Example |
| 12 | 2 | 6.5 | 18 | Adaptive control | 0.7 mm | Good | Example |
| 13 | 2 | 6.5 | 18 | Adaptive control | No sheet gap | Good | Example |
| 14 | 2 | 6.5 | 18 | Adaptive control | 1.0 mm | Good | Example |
| 15 | — | — | — | — | 1.5 mm | Poor (splashing) | Comparative Example |
| 16 | — | — | — | — | No sheet gap | Poor (insufficient nugget) | Comparative Example |
| 17 | — | — | — | — | 1 mm | Poor (expulsion) | Comparative Example |
| 18 | — | — | — | — | 1 mm | Poor (expulsion) | Comparative Example |

In all Examples, no expulsion occurred, and a nugget with a diameter of 4√t' or more was obtained between the thin and thick sheets and between the thick sheets.

In all Comparative Examples, on the other hand, either expulsion occurred or a sufficient nugget was not formed.

REFERENCE SIGNS LIST 11 steel sheet (thin sheet)
12, 13 steel sheet (thick sheet)
14 electrode
15 spacer

The invention claimed is:

1. A resistance spot welding method of squeezing, by a pair of electrodes, a sheet combination in which a thin sheet is overlapped on at least one face of two or more overlapping thick sheets, and passing a current while applying an electrode force to join the sheet combination, the resistance spot welding method comprising:
performing test welding; and
performing actual welding after the test welding,
wherein in each of the test welding and the actual welding, a current pattern is divided into two or more steps including a first current passage step and a second current passage step subsequent to the first current passage step,
in the test welding, an amount of time variation of an instantaneous amount of heat generated per unit volume as a time variation curve and a cumulative amount of heat generated per unit volume are stored for each of the current passage steps, both the amount of time variation and the cumulative amount of heat being calculated from an electrical property between the electrodes when forming an appropriate nugget by passing a current by constant current control, and
in the actual welding, a current that causes no expulsion is selected to perform welding by constant current control in the first current passage step, and, from the subsequent second current passage step onward, the stored time variation curve is used as a target and, when a time variation of the instantaneous amount of heat generated of the actual welding differs from the stored time variation curve in any current passage step by a difference, adaptive control welding is performed to control a current passage amount in order to compensate for the difference within a remaining welding time in the current passage step so that a cumulative amount of heat generated in the current passage step of the actual welding matches the stored cumulative amount of heat generated in the current passage step of the test welding.

2. The resistance spot welding method according to claim 1,
wherein $0.6Is \leq I1 \leq 0.95Is$,
where $I1$ is the current in the first current passage step, and $Is$ is a minimum current having a possibility of causing expulsion in absence of disturbances in the first current passage step.

3. The resistance spot welding method according to claim 1,
wherein in the actual welding, an electrode force pattern is divided into two or more steps including a first electrode force application step and a second electrode force application step subsequent to the first electrode force application step, and
at least for the first electrode force application step and the second electrode force application step,
$F1 < F2$,
where F1 is an electrode force in the first electrode force application step, and F2 is an electrode force in the second electrode force application step.

4. The resistance spot welding method according to claim 1,
wherein at least for the first current passage step and the second current passage step in the test welding,
$I1' > I2'$,
where I1' is a current in the first current passage step, and I2' is a current in the second current passage step.

5. A method for manufacturing a resistance spot welded joint by the resistance spot welding method according to claim 1.

6. The resistance spot welding method according to claim 2,
wherein in the actual welding, an electrode force pattern is divided into two or more steps including a first electrode force application step and a second electrode force application step subsequent to the first electrode force application step, and
at least for the first electrode force application step and the second electrode force application step,
$F1 < F2$,
where F1 is an electrode force in the first electrode force application step, and F2 is an electrode force in the second electrode force application step.

7. The resistance spot welding method according to claim 2,
wherein at least for the first current passage step and the second current passage step in the test welding,
$I1' > I2'$,
where I1' is a current in the first current passage step, and I2' is a current in the second current passage step.

8. The resistance spot welding method according to claim 3,
wherein at least for the first current passage step and the second current passage step in the test welding,
$I1' > I2'$,
where I1' is a current in the first current passage step, and I2' is a current in the second current passage step.

9. The resistance spot welding method according to claim 6,
wherein at least for the first current passage step and the second current passage step in the test welding,
$I1' > I2'$,
where I1' is a current in the first current passage step, and I2' is a current in the second current passage step.

10. A method for manufacturing a resistance spot welded joint by the resistance spot welding method according to claim 2.

11. A method for manufacturing a resistance spot welded joint by the resistance spot welding method according to claim 3.

12. A method for manufacturing a resistance spot welded joint by the resistance spot welding method according to claim 4.

13. A method for manufacturing a resistance spot welded joint by the resistance spot welding method according to claim 6.

14. A method for manufacturing a resistance spot welded joint by the resistance spot welding method according to claim 7.

15. A method for manufacturing a resistance spot welded joint by the resistance spot welding method according to claim 8.

16. A method for manufacturing a resistance spot welded joint by the resistance spot welding method according to claim 9.

* * * * *